United States Patent [19]

Sipinen et al.

[11] Patent Number: 4,769,283

[45] Date of Patent: Sep. 6, 1988

[54] PRESSURE-SENSITIVE ADHESIVE TAPE

[75] Inventors: Alan J. Sipinen; Del A. Kauss, both of Maplewood, Minn.

[73] Assignee: Minnesota Mining and Manufacturing Company, St. Paul, Minn.

[21] Appl. No.: 824,868

[22] Filed: Jan. 31, 1986

[51] Int. Cl.$^4$ .......................... C09J 7/02; A61F 13/16
[52] U.S. Cl. ...................... 428/343; 428/40; 428/352; 525/240; 604/389; 604/390
[58] Field of Search ............. 428/40, 343, 349, 352, 428/220; 604/390, 389; 524/322; 585/417; 525/211, 193, 240

[56] References Cited

U.S. PATENT DOCUMENTS

| | | | |
|---|---|---|---|
| 3,630,201 | 12/1971 | Endres | 604/390 |
| 3,700,614 | 10/1972 | Schenkerberg | 524/322 |
| 3,853,595 | 12/1974 | Pedginski et al. | 428/343 |
| 3,937,221 | 2/1976 | Tritsch | 604/389 |
| 3,941,859 | 3/1976 | Batluk et al. | 525/211 |
| 3,993,826 | 11/1976 | Butler et al. | 428/220 |
| 4,036,912 | 7/1977 | Stricharczuk | 585/417 |
| 4,087,485 | 5/1978 | Huff | 525/193 |
| 4,237,889 | 12/1980 | Gobran | 428/40 X |
| 4,461,872 | 7/1984 | Su | 525/250 |

FOREIGN PATENT DOCUMENTS

| | | | |
|---|---|---|---|
| 0113955 | 7/1984 | European Pat. Off. | 428/349 |
| 0120562 | 10/1984 | European Pat. Off. | 525/240 |
| 2007685A | 5/1979 | United Kingdom | 525/240 |

*Primary Examiner*—Thomas J. Herbert
*Attorney, Agent, or Firm*—D. M. Sell; C. Truesdale

[57] ABSTRACT

Normally tacky, pressure-sensitive adhesive tapes which are soft, pliable, conformable, and heat sealable are provided. The tapes have a backing of a substantially untensilized, tough, ductile film, the film being a blend of crystalline isotactic polypropylene and a compatible ethylene-based polymer, and a normally tacky, pressure-sensitive adhesive on one side of the film. The films have a longitudinal secant modulus of less than 3700 kg/cm$^2$, a transverse secant modulus of less than 3700 kg/cm$^2$, a longitudinal elastic modulus of less than 5200 kg/cm$^2$, a transverse elastic modulus of less than 5200 kg/cm$^2$, a longitudinal stiffness of less than 1.7, and a transverse stiffness of less than 3.0.

17 Claims, No Drawings

PRESSURE-SENSITIVE ADHESIVE TAPE

This invention relates to a normally tacky, pressure-sensitive adhesive tape having a polyolefin-based backing. The tape is particularly useful for fasteners on disposable diapers.

Disposable diapers normally have a liquid permeable layer designed to be placed next to the skin of the infant, a liquid impermeable layer which forms the outer portion of the diaper in use, and an absorbent layer between the liquid permeable layer and the liquid impermeable layer. The diaper is secured around the infant by a pressure-sensitive adhesive tape closure.

A widely used tape for diaper closures has a paper backing treated with a moisture-resistant polymer and a release coating on one face and a normally tacky, pressure-sensitive adhesive on the other face. Paper is a surprisingly expensive material, and its cost is increased by the several treatments to which it is subjected in preparing a tape suitable for diaper closure use. Even treated paper retains a moisture-sensitivity which occasionally weakens it sufficiently to cause it to fail when used as the backing in a tape closure for a diaper worn by an active baby. Further, paper is comparatively stiff, so that the tape does not flex with the diaper and the edge of a paper tape closure may injure a baby's tender skin.

Cloth is a more attractive, flexible and tear-resistant tape backing than paper, but the process of weaving it is expensive, special treatments are required to prevent the penetration of adhesive through the backing, and there is a tendency for it to ravel. Various types of non-woven tape backings, including the so-called "spun-bonded" polymeric backings, are less expensive to make and more ravel-resistant than woven cloth, but their thickness, tear-resistance, etc. are not uniform and their open nature makes application of an adhesive coating difficult and expensive.

For many years, various polymeric films have been employed as the backings for normally tacky, pressure-sensitive adhesive tape. Such tape has been suggested for use in connection with diapers; see, e.g., U.S. Pat. Nos. 3,630,201 (Endres) and No. 3,937,221 (Tritsch). Although polymeric films may be comparatively inexpensive, when such conventional film-backed tape is used as a diaper closure, it displays excessive stiffness which increases the difficulty of preparing closure strips and causes discomfort to the wearer since the tape does not flex with the diaper material.

U.S. Pat. No. 4,237,889 (Gobran) discloses a normally tacky, pressure-sensitive adhesive tape for diaper closure. The tape backing is a substantially untensilized, tough, ductile film of isotactic polypropylene or linear high density polyethylene having one smooth face and one textured face. While this tape exhibits improved flexibility over prior film tapes, it still lacks the desired softness and conformability.

U.S. Pat. No. 3,700,614 (Schenkerberg) discloses polypropylene blends containing stearic acid coated calcium carbonate particles, crystalline polypropylene, and an elastomeric component which is polyisobutylene, amorphous ethylene/propylene copolymer or ethylene/propylene/diene terpolymer, which are stated to have improved impact strength and flexural stiffness.

U.S. Pat. No. 4,036,912 (Stricharczuk) discloses polymer blends of (1) an ethylene-propylene or ethylene-propylene-diene polymer having an ethylene content of at least about 65%, a melt endotherm value of from about 2 to about 15 calories per gram and an ethylene sequence index of from about 30/1 to about 70/1 and (2) a crystalline polypropylene polymer, which blends are stated to have excellent tensile strength.

U.S. Pat. No. 3,941,859 (Batiuk et al.) discloses polymer blends of ethylene-propylene-diene terpolymers with polyethylene and an ethylene-vinyl acetate copolymer, which blends are stated to exhibit superior tensile strength.

European Patent Application Publication No. 0120562 (Exxon) discloses a composition blend for making optically clear, flexible films and other products consisting essentially of an ethylene-propylene elastomer and polypropylene. European Patent Application Publication No. 0113955 (Exxon) discloses thermoplastic coatings extrusion coated onto substrates using a composition of an ethylene polymer, a propylene homo- or copolymer, and an olefinic elastomer.

The present invention provides normally tacky, pressure-sensitive adhesive tapes which are soft, pliable, conformable, and heat sealable.

The invention comprises a normally tacky, pressure-sensitive adhesive tape having a backing of a substantially untensilized, tough, ductile film, the film being a blend of crystalline isotactic polypropylene and a compatible ethylene-based polymer, the film having a longitudinal secant modulus of less than 3700 kg/cm$^2$, a transverse secant modulus of less than 3700 kg/cm$^2$, a longitudinal elastic modulus of less than 5200 kg/cm$^2$, a transverse elastic modulus of less than 5200 kg/cm$^2$, a longitudinal stiffness of less than 1.7, and a transverse stiffness of less than 3.0, and a normally tacky, pressure-sensitive adhesive on one side of the film.

To achieve these properties, the film preferably comprises a blend of 20 to 85 weight percent, more preferably 40 to 60 weight percent, crystalline isotactic polypropylene and 15 to 80 weight percent, more preferably 40 to 60 weight percent of a compatible ethylene-based polymer, except when the ethylene-based polymer is low density polyethylene, the ethylene-based polymer comprises 20 to 80 weight percent of the blend.

The ethylene-based polymers must be chemically and/or mechanically compatible with the crystalline isotactic polypropylene to permit effective blending during extrusion and to minimize gross phase separation with aging. Such compatibility can be assessed, for example, by comparing melt flow characteristics of the ethylene-based polymer with that of the polypropylene, since similar viscosity properties aid in obtaining acceptable blending. The melt indices of both the polypropylene and the ethylene-based polymer can be measured by ASTM Test No. 1238.

The compatibility of the ethylene-based polymer and polypropylene will depend to a certain extent on molecular weight. If the molecular weights are comparable, compatibility will be improved.

A further method for measuring compatibility involves the use of differential scanning calorimetry (DSC) to measure the melting points and glass transition temperatures of the polymer blend. If two glass transition temperatures are detected by DSC due to the constituent polymers in a blend, the blend is said to be incompatible. If a single glass transition temperature, intermediate between those of the component polymers, is detected, the blend is said to be compatible. Mechanically compatible blends represent a deviation from this generality, since they exhibit two glass transition temperatures but have finer morphology and are translucent. Compatible blends that include a crystalline component have several common characteristics. First, they exhibit a single glass transition temperature that is composition dependent. Second, noncrystalline polymer acts as a diluent that lowers the crystallization temperature of the crystalline phase while the glass transition temperature increases and reduces the area under the melting endotherm.

The molecular weights of the polypropylene resin used can have a wide range, preferably in the " range of 2 to $4 \times 10^5$, and the resin preferably has a melt index of from about 8 to 12 grams per 10 minutes. Such polypropylene resins are readily available from commercial sources such as Cosden Oil and Chemical Company, Deer Park, TX, Exxon Chemical Americas, Houston, TX, Himont USA, Inc., Wilmington, DE and Shell Chemical Co., Houston, TX.

The ethylene-based polymers useful in the present invention may be terpolymers, such as ethylene-propylene-diene (EPDM), copolymers such as ethylene-vinyl acetate (EVA) and ethylene-acrylic acid (EAA), and homopolymers such as low density polyethylene (LDPE) and very low density polyethylene (VLDPE) and combinations thereof.

The ethylene-based terpolymers include elastomeric random or block polymers of ethylene and two other monomers such as propylene and a diene, e.g., 1,4-hexadiene. Preferably, the ethylene content is from about 50 to 70 weight percent, more preferably 55 to 65 weight percent. Preferably, the propylene content is from about 25 to 50 weight percent, more preferably about 35 to 45 weight percent. Preferably, the diene content is from about 0.5 to 4.0 weight percent, more preferably from about 1 to 3 weight percent. In such terpolymers the diene is usually dicyclopentadiene, 1,4-hexadiene, methylene norbornene, ethylidene norbornene, cyclooctadiene and the like.

In a preferred mode of the invention, the EPDM is preblended with a compatible semicrystalline polymer such as high density polyethylene or an ethylene-propylene random or block copolymer having about 0.5 to 4.5 weight percent ethylene for the random copolymer or 0.5 to 10 weight percent ethylene for the block copolymer. The preblend preferably contains 70 to 95 weight percent of the terpolymer and about 5 to 30 weight percent of the high density polyethylene or ethylene-propylene copolymer. The preblend preferably has a melt flow index of about 1 to 4 grams/10 min. The base EPDM rubber preferably has a Mooney viscosity of about 45 at 121° C. and M(60) modulus of about 55 kg/cm. The semicrystalline polymer aids in the dispersion of the EPDM rubber in the polypropylene. The choice of this particular EPDM based dispersion is by no means limiting and is based on a particular combination of desired properties, ease of dispersion and handling, processability and cost/performance ratio.

Preferred ethylene-based copolymers include ethylene-vinyl acetate and ethylene-acrylic acid copolymers. When the copolymer used is ethylene-vinyl acetate copolymer, the vinyl acetate content is 5 to 50 weight percent, preferably about 10 to 30 weight percent, and the melt index of the copolymer is preferably about 0.2 to 50, more preferably 0.2 to 25. When the copolymer used is ethylene-acrylic acid copolymer, the acrylic acid content is preferably about 5 to 10 weight percent, and the melt index of the copolymer is preferably about 1.5 to 20, more preferably 1.5 to 10.

Other ethylene-based copolymers useful in the present invention include ethylene-propylene copolymers, polyethylene-zinc acrylate copolymers, polyethylene-ethyl acrylate copolymers, polyethylene-butylene copolymers, polyethylene-methyl acrylate copolymers, and polyethylene-methyl methacrylate copolymers.

The very low density polyethylenes useful in the present invention have densities of about 0.9 to 0.91 for example, 0.906 and 0.900, with melt indices of 0.8 and 0.4 respectively. The polyethylenes with densities less than 0.910 are categorized as very low density polyethylenes and have elastomeric character.

Although the preferred ethylene-based copolymers useful in this invention are the terpolymers, copolymers, and very low density polyethylene homopolymers, low density polyethylene may also be used. Low density polyethylenes are categorized as having densities of 0.925 to 0.910.

For the film base of the tape of the invention the polymers are mixed in a range of from about 15 to 80 weight percent ethylene-based polymer, except, when the ethylene-based polymer is low density polyethylene, use of 20 to 80 weight percent is necessary, with 20 to 85 weight percent crystalline isotactic polypropylene. Preferably, the ethylene-based polymer is present in an amount of 40 to 60 weight percent of the blend. The use of less than 15 weight percent of the ethylene-based polymer (less than 20 weight percent when the ethylene-based polymer is low density polyethylene) in the polymer blend does not give the enhanced softness and pliability properties in the tape of this invention, while use of over 80 weight percent of ethylene-based polymer in the polymer blend results in inferior tensile and modulus properties.

The film base for the tape of the invention is prepared from the above-described blends according to well-known extrusion casting techniques. The ethylene-based polymer and the crystalline isotactic polypropylene components are dry-blended in the desired ratio and fed into an extruder. The film typically can be made by extruding the molten polymer blend at a temperature of about 215° C. to 275° C. through a slot extrusion die and then into a nip between a rubber-covered roll and a water-cooled metal chill roll. In general, the chill roll temperature is 5° to 80° C., depending upon the blend composition, roll contact time and desired tensile/modulus properties. Higher chill roll temperatures generally result in higher modulus and stiffness values. The chill roll may incorporate a shiny chrome finish, matte finish, or engraved pattern, including those disclosed in U.S. Pat. No. 4,237,889. The chill roll contact time will generally be about 0.2 to 1.5 seconds, depending upon roll size, line speed, composition, and desired tensile/modulus properties. An increase in chill roll contact time generally results in lowering of the modulus and stiffness values. The resulting film can be treated by any one or more known techniques, (e.g. corona treatment, flame treatment and ultraviolet irradiation) to enhance surface bonding if desired and wound into a roll. The resulting film is untensilized, i.e., it has not been subjected to longitudinal or transverse stretching after extrusion, although molecular alignment may occur during processing and/or aging.

The incorporation of the ethylene-based polymeric material in no way precludes incorporation of pigment, fragrances, fillers, and/or dyes. Such materials may be incorporated in amounts up to a total of 10% of the weight of the film without detrimentally affecting the foil. In a preferred embodiment of this invention, pigment is incorporated to impart desired color and opacity to the foil.

Since the ethylene-based polymers employed in this invention are chemically or mechanically compatible with the polypropylene, combinations of 2 or more of the ethylene-based polymers may be blended with the polypropylene. The improved combination of properties of these films such as softness, flexibility, tensile strength and modulus are obtained not only by selection of amount and type of elastomer but also by controlling the percent crystallinity and spherulite size of the polymer blend which are in turn controlled by the parameters defining the quench rate.

The films prepared from the blend of polypropylene and ethylene-based polymer provide the pressure-sensitive adhesive tapes of the invention with the flexibility, softness, heat sealability, sonic weldability, and tensile/modulus properties desired in diaper closures, and have the following characteristics:

(a) longitudinal secant modulus (5%) of less than about 3700 kg/cm$^2$, preferably between about 750 and 3000 kg/cm$^2$;

(b) transverse secant modulus (5%) of less than about 3700 kg/cm$^2$, preferably between about 650 and 3000 kg/cm$^2$;

(c) longitudinal elastic modulus of less than about 5200 kg/cm$^2$, preferably between about 1000 to 4000 kg/cm$^2$;

(d) transverse elastic modulus of less than about 5200 kg/cm$^2$, preferably between about 800 to 3500 kg/cm$^2$;

(e) longitudinal stiffness of less than about 1.7 units and preferably between about 0.3 and 1.2 units; and (f) transverse stiffness of less than about 3.0 units, preferably between about 0.3 and 2.2 units.

Note: longitudinal properties are reported for tests conducted on the film in extruder machine direction; transverse properties are reported for tests conducted on the film transverse to the extruder machine direction.

The crystallization behavior of isotactic polypropylene is well known. Very rapid rates of crystallization occur as the melt is initially quenched. Secondary crystallization, occurring at a much slower rate, is encountered during the first week after extrusion, after which the crystallization behavior remains relatively constant. The blending of elastomers into polypropylene inhibits the crystallization of polypropylene to a degree dependent upon the amount of added elastomer, however, the primary and secondary crystallization processes remain and must be accounted for. Films were aged and then tested after a minimum of two weeks to ensure equilibrium of properties.

In order to measure the film characteristics, the following test procedures are used:

Secant and Elastic Modulus:

A 25.3 mm by 150 mm strip of film is mounted in a tensile testing machine (e.g. an Instron Tensile Tester available from Instron Corp.) with the upper and lower jaws 25.4 mm apart. The jaws are then separated at the rate of 254 mm/minute until the yield point is reached. Many of the films of this invention do not exhibit a well defined yield point and thus elastic and secant modulus are used for characterization.

The secant modulus, which relates to softness and pliability, is calculated by the method in ASTM D882 Sec. 11.8. A tangent is drawn to the initial linear portion of the load-extension curve. The tensile stress at a 5% strain is calculated by dividing the load by the average original cross-section of the test section. The elastic modulus is calculated by the method in ASTM D882 Sec. 2 11.7. It is calculated by drawing a tangent to the initial linear portion of the load-extension curve, selecting any point on this tangent and dividing the tensile stress by the corresponding strain. Elastic and secant modulus are reported in kg/cm$^2$. The film is tested a minimum of 2 weeks after extrusion to ensure that equilibrium has been reached.

Stiffness:

A test specimen 3.8 cm wide and 3.8 cm long is mounted in a Taber V-5 Stiffness Tester equipped with a 0.0-1.0 unit Ultrasensitive range attachment. The bending moment required to flex the sample $\pm 15°$ is determined for both machine direction and cross direction according to test PSTC-37 described in Test Methods for Pressure-Sensitive Tapes, 6th edition (1970). Values are reported in stiffness units.

Heat Seal Strength:

Samples of films were heat sealed to 3.5 mil cast polypropylene films and 1.5 mil cast low density polyethylene films at temperatures of 200° F., 225° F., 275° F. and 300° F. at a pressure of 35 psi with a Sentinel Heat Sealer available from Packaging Industries Inc., Hyannis, MA. Samples sealed to polypropylene used a seal time of one sec. and samples sealed to polyethylene were placed between sheets of silicone release paper with a seal time of 4 sec. A 25.3 mm by 150 mm strip of the sealed films was mounted in a tensile testing machine (e.g., an Instron Tensile Tester available from Instron Corp.) with the upper and lower jaws 25.4 mm apart, and with the sealed blended film in the lower jaw and the sealed substrate film in the upper jaw. The jaws were then separated at the rate of 25.4 mm/minute producing a "T-peel" test. Values are reported in grams.

The film backing is converted into tape by applying a layer of normally tacky and pressure-sensitive adhesive to one face, using conventional priming techniques as required. The adhesive may be transparent or, if desired, colored by incorporating dyes and pigments in a conventional manner. Where the tape is to be used in making closures for disposable diapers, it is important that the adhesive be capable of bonding firmly to the diaper cover, which is usually polyethylene film. Rubber-resin type pressure-sensitive adhesives are well-suited for this purpose, the "rubber" being either natural rubber or a synthetic copolymer. The type and amount of resin employed will depend on both the rubber and the degree of adhesiveness desired, appropriate adjustments being readily accomplished according to well-known procedures. Acrylate adhesives, e.g., a 94.5:5.5 isooctyl acrylate:acrylic acid copolymer as disclosed in U.S. Re. Pat. No. 24,906, may also be employed. Similarly, if the tape is to be converted into a closure for conventional cloth diapers, it may be desirable to utilize moisture-resistant adhesives of the type disclosed in U.S. Pat. No. 4,074,004. The tape is normally made on wide sheets of film and then slit to desired widths and lengths and wound convolutely around cores. Diaper closures are formed by cutting appropriately-sized strips (e.g., 2.5 cm $\times$ 7.5 cm) from the tape.

A further benefit of the tapes of this invention is that the tapes, in many cases, do not require a release coat to achieve relatively low unwinding force when in roll form. The blends of polypropylene and ethylene-based polymer inherently have lower surface energy values than polypropylene. Upon blending the ethylene-based polymers with polypropylene at appropriate levels and furthermore producing films from these blends with a roughened matte finish to reduce contact area, rolls of tape can be produced from these films which do not require a release coating and, thus, can have an uncoated backside, i.e., the non-adhesive side of the tape is uncoated. Particularly surprisingly low surface energy, for example, as low as 40 erg/cm$^2$, or lower, is achieved where the ethylene-based polymer is very low density polyethylene and is present in the film in amounts of 40 to 80 weight percent.

A further benefit of the films of this invention is that the addition of the described elastomers to polypropylene lowers the softening temperature of the films, allowing the films and tapes produced from these films to be readily heat sealable and readily sonic welded to a variety of substrates such as polypropylene and polyethylene.

Objects and advantages of this invention are further illustrated by the following examples which should not be construed to unduly limit the invention. In the examples, all parts and percentages are by weight unless otherwise indicated.

EXAMPLES 1-4

Film samples were prepared using crystalline isotactic polypropylene homopolymer (PP) ("Dypro" 8771, 95% isotactic polypropylene, density 0.905, available from Cosden Oil and Chemical Company, Deer Park, TX); 85% ethylene-propylene-diene terpolymer/15% high density polyethylene (EPDM/PE) ("Nordel" NDR-5501, density 0.87, melt flow index 2.0, available from DuPont Company, Elastomer Chemicals Dept., Wilmington, DE) and polypropylene/titanium dioxide pigment (PP/TiO$_2$) (101P, 50% crystalline polypropylene/50% titanium dioxide, density 1.40, available from C.B. Edwards Company, New Hope, MN) in the amounts shown in Table 1.

The polymers were dry-blended and heated to the molten state. The molten polymer blend was extruded through a slot extrusion die at a temperature shown in Table 1, and then into the nip between a silicone rubber-covered roll having an average roughness (Ra) of 20 and an average maximum profile height (Rpm) of 115, and a water cooled metal chill roll having an Ra of 250 and an Rpm of 220, to effect quenching and provide a matte finish. The roughness properties, Ra and Rpm, were measured with a Surtronic 3, available from Tayler-Hobson, Leichester, England. The temperature of the chill roll and the chill roll contact time are shown in Table 1. The surfaces of the resulting film were primed using conventional corona discharge techniques immediately after extrusion and then aged at room temperature (70° F., 21° C.) for at least two weeks to allow the physical properties to reach equilibrium prior to testing for physical characteristics.

TABLE 1

| | Example | | |
|---|---|---|---|
| | 1 | 2 | 3 |
| Composition | | | |
| PP (%) | 75 | 60 | 45 |
| EPDM/PE (%) | 20 | 35 | 50 |
| PP/TiO$_2$ (%) | 5 | 5 | 5 |
| Processing conditions | | | |
| Chill roll | 24 | 24 | 24 |

TABLE 1-continued

| | Example | | |
|---|---|---|---|
| | 1 | 2 | 3 |
| temperature (°C.) | | | |
| Chill roll contact time (sec.) | 0.79 | 0.79 | 0.79 |
| Melt temperature (°C.) | 241 | 243 | 246 |
| Film properties | | | |
| Calipered thickness (microns) | 125 | 125 | 125 |
| Secant modulus (kg/cm$^2$) | | | |
| longitudinal | 2710 | 2400 | 1760 |
| transverse | 2360 | 1910 | 1330 |
| Elastic modulus (kg/cm$^2$) | | | |
| longitudinal | 3990 | 3110 | 2370 |
| transverse | 3450 | 2770 | 1760 |
| Stiffness | | | |
| longitudinal | 1.0 | 0.9 | 0.7 |
| transverse | 1.7 | 1.2 | 0.9 |

The data in Table 1 demonstrates that as the amount of the EPDM/PE in the polymer blend increases, the film produced therefrom, at a given thickness, have reduced secant and elastic modulus in both the longitudinal and transverse directions and reduced stiffness. Thus, greater amounts of the EPDM/PE ethylene-based polymer provide greater softness and pliability.

COMPARATIVE EXAMPLE 1

A film sample was prepared as in Examples 1-3, except that the ethylene-based polymer was omitted. The composition, quench conditions, and film properties are set forth in Table 2.

TABLE 2

| | Comparative Example 1 |
|---|---|
| Composition | |
| PP (%) | 95 |
| PP/TiO$_2$ (%) | 5 |
| Processing conditions | |
| Chill roll temperature (°C.) | 32 |
| Chill roll contact time (sec.) | 0.79 |
| Melt temperature (°C.) | 229 |
| Film properties | |
| Calipered thickness (microns) | 107 |
| Secant modulus (kg/cm$^2$) | |
| longitudinal | 4220 |
| transverse | 4030 |
| Elastic modulus (kg/cm$^2$) | |
| longitudinal | 6130 |
| transverse | 6040 |
| Stiffness | |
| longitudinal | 2.2 |
| transverse | 5.6 |
| Surface energy (erg/cm$^2$) | 50 |

Comparative Example 1 demonstrates the high longitudinal and transverse secant modulus, high longitudinal and transverse elastic modulus, and stiffness which occur with a film containing no ethylene-based polymer, which properties are indicative of a harder, less pliable film than those containing the ethylene-based polymer as typified by Examples 1-3.

EXAMPLES 4-6

Film samples were prepared as in Examples 1-3, using varying chill roll temperatures, contact times, and film thicknesses, except that Example 4 was extruded into smooth nip rolls. The compositions, processing conditions, and film properties are shown in Table 3.

TABLE 3

|  | Example | | |
|---|---|---|---|
|  | 4 | 5 | 6 |
| Composition |  |  |  |
| PP (%) | 35 | 35 | 35 |
| EPDM/PE (%) | 60 | 60 | 60 |
| PP/TiO$_2$ (%) | 5 | 5 | 5 |
| Processing conditions |  |  |  |
| Chill roll temperature (°C.) | 21 | 17 | 17 |
| Chill roll contact time (sec.) | 0.79 | 0.79 | 0.79 |
| Melt temperature (°C.) | 232 | 241 | 243 |
| Film properties |  |  |  |
| Calipered thickness (microns) | 77 | 95 | 107 |
| Secant modulus (kg/cm$^2$) |  |  |  |
| longitudinal | 2130 | 1210 | 1040 |
| transverse | 1620 | 970 | 790 |
| Elastic modulus (kg/cm$^2$) |  |  |  |
| longitudinal | 3080 | 1540 | 1370 |
| transverse | 2400 | 1220 | 1140 |
| Stiffness |  |  |  |
| longitudinal | 0.9 | 0.8 | 1.0 |
| transverse | 1.1 | 1.0 | 1.1 |

EXAMPLES 7-11

Film samples were prepared as in Examples 1-3, except that an ethylene-vinyl acetate copolymer (EVA) ("Elvax" 450, 28% vinyl acetate, melt index 25 g/10 min., available from Dupont Company, Polymer Products Dept., Wilmington, DE) was substituted for the EPDM/PE. The compositions, quench conditions, and film properties are set forth in Table 4.

TABLE 4

|  | Example | | | | |
|---|---|---|---|---|---|
|  | 7 | 8 | 9 | 10 | 11 |
| Composition |  |  |  |  |  |
| PP (%) | 55 | 35 | 35 | 35 | 15 |
| EVA (%) | 40 | 60 | 60 | 60 | 80 |
| PP/TiO$_2$ (%) | 5 | 5 | 5 | 5 | 5 |
| Processing conditions |  |  |  |  |  |
| Chill roll temperature (°C.) | 17 | 17 | 17 | 17 | 17 |
| Chill roll contact time (sec.) | 0.79 | 0.79 | 0.79 | 0.79 | 0.79 |
| Melt temperature (°C.) | 232 | 227 | 227 | 229 | 224 |
| Film properties |  |  |  |  |  |
| Calipered thickness (microns) | 107 | 95 | 107 | 118 | 107 |
| Secant modulus (kg/cm$^2$) |  |  |  |  |  |
| longitudinal | 2580 | 1640 | 1830 | 2040 | 890 |
| transverse | 2080 | 1360 | 1310 | 1580 | 670 |
| Elastic modulus (kg/cm$^2$) |  |  |  |  |  |
| longitudinal | 3590 | 2020 | 2190 | 2480 | 1060 |
| transverse | 2730 | 1600 | 1560 | 1810 | 690 |
| Stiffness |  |  |  |  |  |
| longitudinal | 0.9 | 0.8 | 0.9 | 1.5 | 0.8 |
| transverse | 2.0 | 1.0 | 1.6 | 1.8 | 1.1 |

Examples 7, 9, and 11 demonstrate that increasing amounts of ethylene-vinyl acetate copolymer results in reduced secant and elastic modulus (longitudinal and transverse) and stiffness, lower modulus and stiffness properties being indicative of greater softness and pliability.

Examples 8, 9, and 10 demonstrate the effect of film thickness. Increasing film thickness results in reduced softness and pliability as evidenced by the increasing modulus and stiffness values.

EXAMPLES 12-15

Film samples were prepared as in Examples 1-3, except that very low density polyethylene (VLDPE) ("Ucar" FLX DFDA 1137, melt index 0.8, available from Union Carbide Corp., Danbury, Conn.) was substituted for the EPDM. The compositions, quench conditions, and film properties are set forth in Table 5.

TABLE 5

|  | Example | | | |
|---|---|---|---|---|
|  | 12 | 13 | 14 | 15 |
| Composition |  |  |  |  |
| PP (%) | 75 | 55 | 35 | 15 |
| VLDPE (%) | 20 | 40 | 60 | 80 |
| PP/TiO$_2$ (%) | 5 | 5 | 5 | 5 |
| Processing conditions |  |  |  |  |
| Chill roll temperature (°C.) | 32 | 32 | 32 | 32 |
| Chill roll contact time (sec.) | 0.79 | 0.79 | 0.79 | 0.79 |
| Melt temperature (°C.) | 232 | 232 | 243 | 252 |
| Film properties |  |  |  |  |
| Calipered thickness (mirons) | 107 | 107 | 107 | 107 |
| Secant modulus (kg/cm$^2$) |  |  |  |  |
| longitudinal | 3500 | 2430 | 1900 | 1070 |
| transverse | 3230 | 2290 | 1740 | 1010 |
| Elastic modulus (kg/cm$^2$) |  |  |  |  |
| longitudinal | 5070 | 4040 | 2990 | 1310 |
| transverse | 4970 | 3810 | 2670 | 1260 |
| Stiffness |  |  |  |  |
| longitudinal | 1.4 | 1.5 | 1.3 | 0.3 |
| transverse | 2.8 | 2.8 | 2.2 | 0.7 |
| Surface energy (erg/cm$^2$) | 46 | 38 | 36 | 32 |

Examples 12-15 demonstrate that as the amount of very low density polyethylene increases, the secant modulus (longitudinal and transverse), elastic modulus (longitudinal and transverse) and stiffness are reduced, indicating increased softness and pliability. The surface energy of the films containing the very low density polyethylene are also reduced, with greater amounts of the very low density polyethylene producing greater reduction in surface energy and providing improved release properties.

EXAMPLES 16-17

Film samples were prepared by dry-blending polypropylene (PP)("Dypro" 8771), polypropylene/-titanium dioxide (PP/TiO$_2$) (101P) and mixtures of ethylene-based polymers. In Example 16, EPDM/PE and VLDPE were used and, in Example 17, EPDM/PE and ethylene-vinyl acetate copolymer (EVA 260) ("Elvax" 260, 28% vinyl acetate, melt index 6.0, available from DuPont Company, Polymer Products Dept., Wilmington, DE) were used. The compositions, processing conditions, and film properties are shown in Table 6.

TABLE 6

|  | Example 16 | Example 17 |
|---|---|---|
| Composition | 55% PP | 55% PP |
|  | 20% VLDPE | 20% EVA(260) |
|  | 20% EMDM/PE | 20% EPDM/PE |
|  | 5% PP/TiO$_2$ | 5% PP/TiO$_2$ |
| Processing conditions |  |  |
| Chill roll temperature (°C.) | 24 | 24 |

TABLE 6-continued

| | Example 16 | Example 17 |
|---|---|---|
| Chill roll contact time (sec.) | 0.79 | 0.79 |
| Melt temperature (°C.) | 243 | 243 |
| Film properties | | |
| Calipered thickness (microns) | 107 | 107 |
| Secant modulus (kg/cm²) | | |
| longitudinal | 2490 | 2080 |
| transverse | 2230 | 1760 |
| Elastic modulus (kg/cm²) | | |
| longitudinal | 3100 | 2700 |
| transverse | 3070 | 2370 |
| Stiffness | | |
| longitudinal | 1.3 | 1.2 |
| transverse | 2.7 | 1.9 |

Examples 16 and 17 demonstrate that combinations of the ethylene-based polymers can be used to achieve reduced secant and elastic modulus and stiffness thereby providing soft, pliable films.

EXAMPLES 18–20 AND COMPARATIVE EXAMPLE 2

Film samples were prepared as in Examples 7, 10, and 15 and Comparative Example 1. The samples were tested for heat seal strength using cast polypropylene as the substrate to which the tape was sealed. The film compositions and heat seal strengths are shown in Table 7.

TABLE 7

| | Film | Heat seal strength (g) at seal temperature (°C.) | | | |
|---|---|---|---|---|---|
| Example | Sample | 93 | 107 | 135 | 149 |
| 18 | 7 | 0 | 0 | 120 | 115 |
| 19 | 10 | 0 | 0 | 70 | 738 |
| 20 | 15 | 0 | 0 | 0 | 388 |
| Comp. 2 | Comp. 1 | 0 | 0 | 0 | 0 |

Examples 18–20 and Comparative Example 2 demonstrate the increase in heat seal strength of films bonded to cast polypropylene provided in the films by the addition of the ethylene-based polymers, the ethylene-vinyl acetate providing the greatest increase.

EXAMPLES 21–23 AND COMPARATIVE EXAMPLE 3

Film samples were prepared as in Examples 7, 10, and 12 Comparative Example 1. The samples were tested for heat seal strength using cast low density polyethylene film as the substrate to which the tape was sealed. The film compositions and heat seal strengths are shown in Table 8.

TABLE 8

| | Film | Heat seal strength (g) at seal temperature °C. | | | |
|---|---|---|---|---|---|
| Example | Sample | 93 | 107 | 135 | 149 |
| 21 | 7 | 0 | 0 | 3 | 41 |
| 22 | 10 | 0 | 2 | 57 | 109 |
| 23 | 15 | 0 | 0 | 1 | 22 |
| Comp. 3 | Comp. 1 | 0 | 0 | 0 | 25 |

Examples 21–23 and Comparative Example 3 demonstrate the increase in heat seal strength of films bonded to low density polyethylene film provided in the films by addition of ethylene-propylene-diene terpolymer and ethylene-vinyl acetate copolymer, the ethylene-vinyl acetate providing the greatest increase.

EXAMPLES 24–26

Film samples were prepared using the method of Examples 1–3, except the ethylene-based polymers used were as follows:

Example 24 (LDPE): NPP 3024 low density polyethylene, density=0.923, available from Northern Petrochemical Company, Rolling Meadows, IL Example 25 (8020): Surlyn 8020 polyethylene/zinc acrylate ionomer, available from DuPont Company Polymer Products Dept., Ethylene Polymers Div., Wilmington, DE.

Example 26 (PB/PE): DP8010 polybutylene/polyethylene copolymer, 0.3 melt index, 5% Polyethylene, available from Shell Chemical Company, Houston, TX.

The compositions, processing conditions, and film properties are shown in Table 9.

TABLE 9

| | Example 24 | Example 25 | Example 26 |
|---|---|---|---|
| Composition | 55% PP 40% LDPE 5% PP/TiO₂ | 55% PP 40% ION 5% PP/TiO₂ | 55% PP 40% PB/PE 5% PP/TiO₂ |
| Processing Conditions | | | |
| Chill roll temperature (°C.) | 24 | 24 | 24 |
| Chill roll contact time (sec.) | 0.79 | 0.79 | 0.79 |
| Melt temperature (°C.) | 238 | 241 | 241 |
| Film properties | | | |
| Calipered thickness (Microns) | 107 | 107 | 107 |
| Secant modulus (kg/cm²) | | | |
| longitudinal | 3210 | 2570 | 1020 |
| transverse | 3150 | 2320 | 1070 |
| Elastic modulus (kg/cm²) | | | |
| longitudinal | 4340 | 3170 | 1120 |
| transverse | 4450 | 2810 | 1230 |
| Stiffness | | | |
| longitudinal | 1.6 | 1.5 | 0.4 |
| transverse | 2.9 | 2.8 | 0.6 |

Examples 24–26 demonstrate that low density polyethylene, polyethylene/zinc acrylate ionomer, and polybutylene/polyethylene copolymer are suitable ethylene-based polymers for reducing modulus and stiffness of the polypropylene film to result in films which are softer and more pliable.

EXAMPLES 27–29

Film samples were prepared using the method of Examples 1–3, except the polypropylene polymers used were as follows:

Example 27 (PP(34)): PP3085L polypropylene, 34.0 melt index, Exxon Chemical Americas, Houston, TX Example 28 (PP(2)): WRS-5-579 polypropylene, 2.0 melt index, Shell Chemical Company, One Shell Plaza, Houston, TX Example 29 (PP/PE): W756 polypropylene/polyethylene random copolymer 7.0 melt index 3.5% polyethylene, Cosden Oil and Chemical, Deer Park, TX The composition, processing conditions, and properties are shown in Table 10.

TABLE 10

|  | Example 27 | Example 28 | Example 29 |
|---|---|---|---|
| Composition | 55% PP (34) 40% EPDM/PE 5% PP/TiO$_2$ | 55% PP (2) 40% EPDM/PE 5% PP/TiO$_2$ | 55% PP/PE 40% EPDM/PE 5% PP/TiO$_2$ |
| Processing Conditions | | | |
| Chill roll temperature | 24 | 24 | 24 |
| Chill roll contact time (sec.) | 0.79 | 0.79 | 0.79 |
| Melt temperature (°C.) | 243 | 252 | 249 |
| Film properties | | | |
| Calipered thickness (Microns) | 107 | 107 | 107 |
| Secant modulus (kg/cm$^2$) | | | |
| longitudinal | 2100 | 2200 | 1540 |
| transverse | 1760 | 1850 | 1310 |
| Elastic modulus (kg/cm$^2$) | | | |
| longitudinal | 2730 | 3310 | 2060 |
| transverse | 2410 | 2590 | 1860 |
| Stiffness | | | |
| longitudinal | 1.2 | 1.6 | 0.8 |
| transverse | 1.8 | 2.6 | 1.9 |

EXAMPLES 30 and 31

In Example 30, film sample was prepared as in Examples 1-3, except polypropylene/calcium carbonate (PP/CaCO$_3$) (PPH7CC-5, 50% polypropylene/50% calcium carbonate, available from Washington-Penn Plastics, Washington, PA) was added. In Example 31, a film sample was made similar to that of Example 30 but without the PP/CaCO$_3$. The composition, processing conditions, and film properties are set forth in Table 11.

TABLE 11

|  | Example 30 | Example 31 |
|---|---|---|
| Composition | 45% PP 40% EPDM/PE 10% PP/CaCO$_3$ 5% PP/TiO$_2$ | 55% PP 40% EPDM/PE 5% PP/TiO$_2$ |
| Processing conditions | | |
| Chill roll temperature (°C.) | 24 | 24 |
| Chill roll contact time (sec.) | 0.79 | 0.79 |
| Melt temperature (°C.) | 243 | 243 |
| Film properties | | |
| Calipered thickness (microns) | 107 | 107 |
| Secant modulus (kg/cm$^2$) | | |
| longitudinal | 1980 | 1800 |
| transverse | 1630 | 1450 |
| Elastic modulus (kg/cm$^2$) | | |
| longitudinal | 2620 | 2210 |
| transverse | 2620 | 1970 |
| Stiffness | | |
| longitudinal | 1.0 | 0.8 |
| transverse | 2.1 | 1.6 |

EXAMPLES 32-33

In Example 32, an adhesive coating solution was prepared by mixing together 17.1% Natural Rubber Pale Crepe, available from Goodyear Tire and Rubber Co., Akron, OH, 13.7% "Piccolyte" S-115 tackifier, available from Hercules, Inc., Wilmington, DE, 0.3% "Santovar" A antioxidant, available from Monsanto Ind. Chem. Co., Akron, OH, 3.4% ethanol, and 65.5% heptane. The solution was knife-coated onto a film prepared as in Example 6 and dried for 5 min. at 200° C. to produce a pressure-sensitive adhesive tape.

In Example 33, an adhesive coating solution was prepared by mixing 28.4% "Kraton" 1107, available from Shell Chem. Co., Belpre, OH, 28.4% "Escorez" 1310, available from Exxon Chem. Co., Baton Rouge, LA, 2.9% "Shellflex" 371, available from Shell Chem. Co., 0.3% "Irganox" 1076, available from Ciba-Geigy Corp., Ardsley, N.Y., and 40.0% toluene. The solution was knife-coated onto a film prepared as in Example 6 and dried for 5 min. at 200° C. to produce a pressure-sensitive adhesive tape.

Each pressure-sensitive adhesive tape was tested for coating weight, adhesion (to steel), and bond (adhesive to film bond). The results are set forth in Table 12. Adhesion was determined using Pressure Sensitive Tape Council Test Method PSTC-1. Bond was determined by adhering a 1.25 cm width tape to a 2.5 cm width tape by rolling once with a 4.5 kg roller. The tapes were pulled apart using a 180° peel angle with the force required measured by a spring scale.

TABLE 12

|  | Example 32 | Example 33 |
|---|---|---|
| Coating weight (g/m$^2$) | 51.0 | 24.7 |
| Adhesion (N/dm) | 66.5 | 42.0 |
| Bond (kg) | >5 | >5 |

We claim:

1. A normally tacky, pressure-sensitive adhesive tape comprising a backing of a substantially untensilized, tough, ductile film, said film comprising a blend of crystalline isotactic polypropylene and a compatible ethylene-based polymer, said film having a longitudinal secant modulus of less than about 3700 kg/cm$^2$, a transverse secant modulus of less than about 3700 kg/cm$^2$, a longitudinal elastic modulus of less than about 5200 kg/cm$^2$, a transverse elastic modulus of less than about 5200 kg/cm$^2$, a longitudinal stiffness of less than about 1.7, and a transverse stiffness of less than about 3.0 and a normally tacky, pressure-sensitive adhesive on one side of the film and said tape being soft, pliable, and conformable.

2. The tape of claim 1 wherein said film is a blend of 20 to 85 weight percent crystalline isotactic polypropylene and 15 to 80 weight percent of a compatible ethylene-based polymer, except when the ethylene-based polymer is low density polyethylene, the ethylene-based polymer comprises 20 to 80 weight percent of the blend.

3. The tape of claim 1 wherein said film contains 40 to 60 weight percent ethylene-based polymer and 40 to 60 weight percent crystalline isotactic polypropylene.

4. The tape of claim 1 wherein said longitudinal secant modulus is between about 750 and 3000 kg/cm$^2$, said transverse secant modulus is between about 650 and 3000 kg/cm$^2$, said longitudinal elastic modulus is between about 1000 and 4000 kg/cm$^2$, said transverse elastic modulus is between about 800 and 3500 kg/cm$^2$, said longitudinal stiffness is between about 0.3 and 1.2 units, and said transverse stiffness is between about 0.3 and 2.2 units.

5. The tape of claim 1 wherein said ethylene-based polymer is a copolymer selected from ethylene-vinyl acetate and ethylene-acrylic acid.

6. The tape of claim 1 wherein said ethylene-based polymer is low density polyethylene.

7. The tape of claim 1 wherein said ethylene-based polymer comprises an ethylene-propylene-diene terpolymer.

8. The tape of claim 7 wherein said terpolymer contains 65 to 85 weight percent ethylene, 5 to 35 weight percent propylene, and 0.5 to 10 weight percent diene.

9. The tape of claim 7 wherein said diene is selected from dicyclopentadiene, 1,4-hexadiene, methylene norbonene, ethylidene norbornene, and cyclooctadiene.

10. The tape of claim 7 wherein said terpolymer is pre-blended with a compatible semicrystalline polymer.

11. The tape of claim 10 wherein said semicrystalline polymer is high density polyethylene.

12. The tape of claim 1 wherein said ethylene-based polymer is very low density polyethylene.

13. The tape of claim 12 wherein said film has a surface energy of less than about 40 erg/cm$^2$.

14. The tape of claim 12 wherein the backside of said tape is uncoated.

15. A normally tacky, pressure-sensitive adhesive tape comprising a backing of a substantially untensilized tough, ductile film, said film comprising a blend of crystalline isotactic polypropylene and a compatible ethylene-based polymer, said film having a longitudinal secant modulus of less than about 3700 kg/cm$^2$, a transverse secant modulus of less than about 3700 kg/cm$^2$, a longitudinal elastic modulus of less than about 5200 kg/cm$^2$, a transverse elastic modulus of less than about 5200 kg/cm$^2$, a longitudinal stiffness of less than about 1.7 and a transverse stiffness of less than about 3.0, and a normally tacky, pressure-sensitive adhesive on one side of the film and the other side of the film being uncoated and said tape being soft, pliable, and conformable.

16. A normally tacky, pressure-sensitive adhesive tape comprising a backing of a substantially untensilized, tough, ductile film, said film comprising a blend of crystalline isotactic polypropylene and a compatible ethylene-based polymer, said ethylene-based polymer being an ethylene-propylene-diene terpolymer pre-blended with a compatible semicrystalline polymer and said film having a longitudinal secant modulus of less than about 3700 kg/cm$^2$, a transverse secant modulus of less than about 3700 kg/cm$^2$, a longitudinal elastic modulus of less than about 5200 kg/cm$^2$, a transverse elastic modulus of less than about 5200 kg/cm$^2$, a longitudinal stiffness of less than about 1.7, and a transverse stiffness of less than about 3.0, and a normally tacky, pressure-sensitive adhesive on one side of the film and said tape being soft, pliable, and comformable.

17. A normally tacky, pressure-sensitive adhesive tape comprising a backing of a substantially untensilized, tough, ductible film, said film comprising a blend of crystalline isotactic polypropylene and very low density polyethylene, said film having a longitudinal secant modulus of less than about 3700 Kg/cm$^2$, a transverse secant modulus of less than about 3700 Kg/cm$^2$, a longitudinal elastic modulus of less than about 5200 Kg/cm$^2$, a traverse elastic modulus of less than about 5200 Kg/cm$^2$, a longitudinal stiffness of less than about 1.7, a traverse stiffness of less than about 3.0, and a surface energy of less than about 40 erg/cm$^2$, and a normally tacky, pressure-sensitive adhesive on one side of the film and said tape being soft, pliable, and conformable.

* * * * *

UNITED STATES PATENT AND TRADEMARK OFFICE
CERTIFICATE OF CORRECTION

PATENT NO. : 4,769,283

DATED : September 6, 1988

INVENTOR(S) : ALAN J. SIPINEN and DEL A. KAUSS

It is certified that error appears in the above-identified patent and that said Letters Patent is hereby corrected as shown below:

Col. 12, l. 44, "1.5" should be -- 1.4 -- .

Col. 13, l. 40, "PP/CaCO$_3$" should be under Example 30 after 10% -- 10% PP/CaCO$_3$ -- .

Signed and Sealed this

Eighth Day of August, 1989

Attest:

DONALD J. QUIGG

*Attesting Officer*

*Commissioner of Patents and Trademarks*